(12) United States Patent
Christensen et al.

(10) Patent No.: US 11,127,084 B1
(45) Date of Patent: *Sep. 21, 2021

(54) SYSTEMS AND METHODS FOR IDENTIFYING AND ASSESSING LOCATION-BASED RISKS FOR VEHICLES

(71) Applicant: STATE FARM MUTUAL AUTOMOBILE INSURANCE COMPANY, Bloomington, IL (US)

(72) Inventors: Scott Thomas Christensen, Bloomington, IL (US); Gregory Hayward, Bloomington, IL (US); Steven Cielocha, Bloomington, IL (US); Todd Binion, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 101 days.

This patent is subject to a terminal disclaimer.

(21) Appl. No.: 16/175,403

(22) Filed: Oct. 30, 2018

Related U.S. Application Data

(63) Continuation of application No. 14/273,093, filed on May 8, 2014, now Pat. No. 10,121,203.

(51) Int. Cl.
*G06Q 40/08* (2012.01)
*G06Q 30/02* (2012.01)
*G06Q 10/06* (2012.01)

(52) U.S. Cl.
CPC ......... *G06Q 40/08* (2013.01); *G06Q 10/0635* (2013.01); *G06Q 30/0266* (2013.01)

(58) Field of Classification Search
CPC ....................................... G06Q 40/08
USPC ....................................... 705/41, 4
See application file for complete search history.

(56) References Cited

U.S. PATENT DOCUMENTS

| | | | |
|---|---|---|---|
| 7,689,361 B2 | 3/2010 | Hijikata | |
| 8,140,358 B1 | 3/2012 | Ling et al. | |
| 8,255,275 B2 | 8/2012 | Collopy et al. | |
| 8,311,858 B2 | 11/2012 | Everett et al. | |
| 8,595,034 B2* | 11/2013 | Bauer | G06Q 40/02 705/4 |
| 8,606,512 B1* | 12/2013 | Bogovich | G06Q 40/08 701/423 |

(Continued)

OTHER PUBLICATIONS

Velocity Weather (Year: 2014).*

(Continued)

*Primary Examiner* — Bruce I Ebersman
(74) *Attorney, Agent, or Firm* — Marshall, Gerstein & Borun LLP

(57) ABSTRACT

Methods and systems for improving vehicular safety by notifying vehicle operators of location-based risks are provided. According to embodiments, a processing server may receive an initial location of a vehicle. Based on location data associated with the initial location, the processing server can determine the risk of an incident. The processing server can generate a notification to communicate to the vehicle operator, and the vehicle operator can assess the risk and take action to mitigate the risk, for example by relocating the vehicle. The processing server can receive updated location data for the vehicle and can determine, based on the updated location data, that the risk has been mitigated.

16 Claims, 5 Drawing Sheets

(56) References Cited

U.S. PATENT DOCUMENTS

| | | | |
|---|---|---|---|
| 8,805,707 B2* | 8/2014 | Schumann, Jr. | ............................ G08G 1/096775 705/4 |
| 8,849,803 B2 | 9/2014 | Grabau et al. | |
| 2003/0064788 A1* | 4/2003 | Walker | .................... G07F 17/32 463/20 |
| 2007/0027726 A1 | 2/2007 | Warren et al. | |
| 2010/0131307 A1* | 5/2010 | Collopy | ................. G06Q 30/04 705/4 |
| 2012/0316916 A1 | 12/2012 | Andrews et al. | |
| 2013/0013348 A1 | 1/2013 | Ling et al. | |
| 2013/0316737 A1 | 11/2013 | Guba et al. | |
| 2015/0324923 A1* | 11/2015 | Christensen | ....... G06Q 30/0266 705/4 |

OTHER PUBLICATIONS noaa.gov, "National Weather Services, NOAA Weather Radio All Hazards," (Jan. 8, 2014). Retrieved from the Internet on Sep. 3, 2014: <http://www.nws.noaa.gov/nwr/>.

velocityweather.com, "Velocity Weather by Baron," (2012). Retrieved from the Internet on Sep. 3, 2014: <http://www.velocityweather.com/>.

blogspot.com, "New Features ahead: Google Maps and Waze Apps Better Than Ever," (2013). Retrieved from the Internet on Sep. 3, 2014: <http://google-latlong.blogspot.com/2013/08/new-features-ahead-google-maps-and-waze.html>.

* cited by examiner

SYSTEMS AND METHODS FOR IDENTIFYING AND ASSESSING LOCATION-BASED RISKS FOR VEHICLES

CROSS-REFERENCE TO RELATED APPLICATIONS

This application is a continuation of U.S. patent application Ser. No. 14/273,093, filed May 8, 2014, which is hereby incorporated by reference in its entirety.

FIELD OF THE DISCLOSURE

This disclosure generally relates to increasing driving or vehicular safety, and in particular, to notifying vehicle operators of various risk and facilitating the mitigation of the risks.

BACKGROUND

There is a constant effort to improve vehicular safety by reducing the risk of incidents that may lead to fatalities, injuries, and damage or theft to vehicles. For example, certain intersections have a high accident rate because of factors such as a high traffic rate or number of lanes. Vehicle or automobile insurance exists to provide financial protection against bodily injury and/or physical damage resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy.

With the prevalence of vehicle or automobile insurance, insurance providers have a vested interest in reducing incidents that lead to fatalities, injuries, and vehicle damage or theft. However, it has proven difficult for insurance providers to warn customers of certain risks when the customer's vehicle is in a location or environment typically known to have a higher rate of incidents. Therefore, the customer may not be aware of such risks of injury and the vehicle may remain more susceptible to damage or theft. Further, the increased incidents of fatalities, injuries, and damage or theft results in more claim filings and an increased cost to insurance providers that is passed on to customers through higher insurance premiums.

Accordingly, there is an opportunity for systems and methods to detect when vehicles are in certain locations and environments that pose increased risks of fatalities, injuries, and damage or theft incidents, and warn vehicle operators of the risks.

SUMMARY

In an embodiment, a computer implemented method of notifying vehicle operators of location-based risks is provided. The method includes receiving an initial location of a vehicle, identifying, by a processor, a risk associated with the initial location, and notifying a user associated with the vehicle of the risk. The method further comprises, subsequent to notifying the user, receiving an updated location of the vehicle, and analyzing, by the processor, the updated location to determine that the risk is mitigated.

In another embodiment, a system for notifying vehicle operators of location-based risks is provided. The system includes a communication module adapted to communicate data, a memory adapted to store non-transitory computer executable instructions, and a processor adapted to interface with the communication module. The processor is configured to execute the non-transitory computer executable instructions to cause the processor to receive, via the communication module, an initial location of a vehicle, identify a risk associated with the initial location, and notify a user associated with the vehicle of the risk. The processor is further configured to, subsequent to notifying the user, receive, via the communication module, an updated location of the vehicle, and analyze the updated location to determine that the risk is mitigated.

DETAILED DESCRIPTION

The novel systems and methods disclosed herein relate generally to identifying risks based on a vehicle location and notifying a vehicle operator of the risks. The vehicle operator may have an associated insurance policy for the vehicle, and an insurance provider has access to various data and information that indicates various risks for various locations. The vehicle may provide its location to the insurance provider and the insurance provider can access data associated with the location to identify a risk that may be posed to the vehicle or the vehicle operator. For example, the vehicle may be approaching a dangerous intersection or may be parked on a street that experiences a high crime rate.

The insurance provider can generate a notification that indicates the risk and provide the notification to an electronic device associated with the vehicle, such as an on-board computer or a mobile device of the vehicle operator. Accordingly, the vehicle operator may be notified of the risk and may be inclined to move the vehicle to a different location. After the vehicle is moved, the vehicle can send an updated location to the insurance provider, where the insurance provider can determine that the risk has been mitigated or reduced. In some embodiments, the insurance provider may identify a reward for the vehicle operator, such as a discount on an insurance premium.

The systems and methods therefore offer a benefit to vehicle operators by effectively and efficiently notifying the vehicle operators of location-based risks. Of course, the vehicle operators are incentivized to mitigate the risks by relocating the vehicles. As a result, fewer incidents may result which reduces the amount of insurance claim filings. The resulting savings experienced by the insurance providers may be then passed on to the policy holders.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Figure 1:
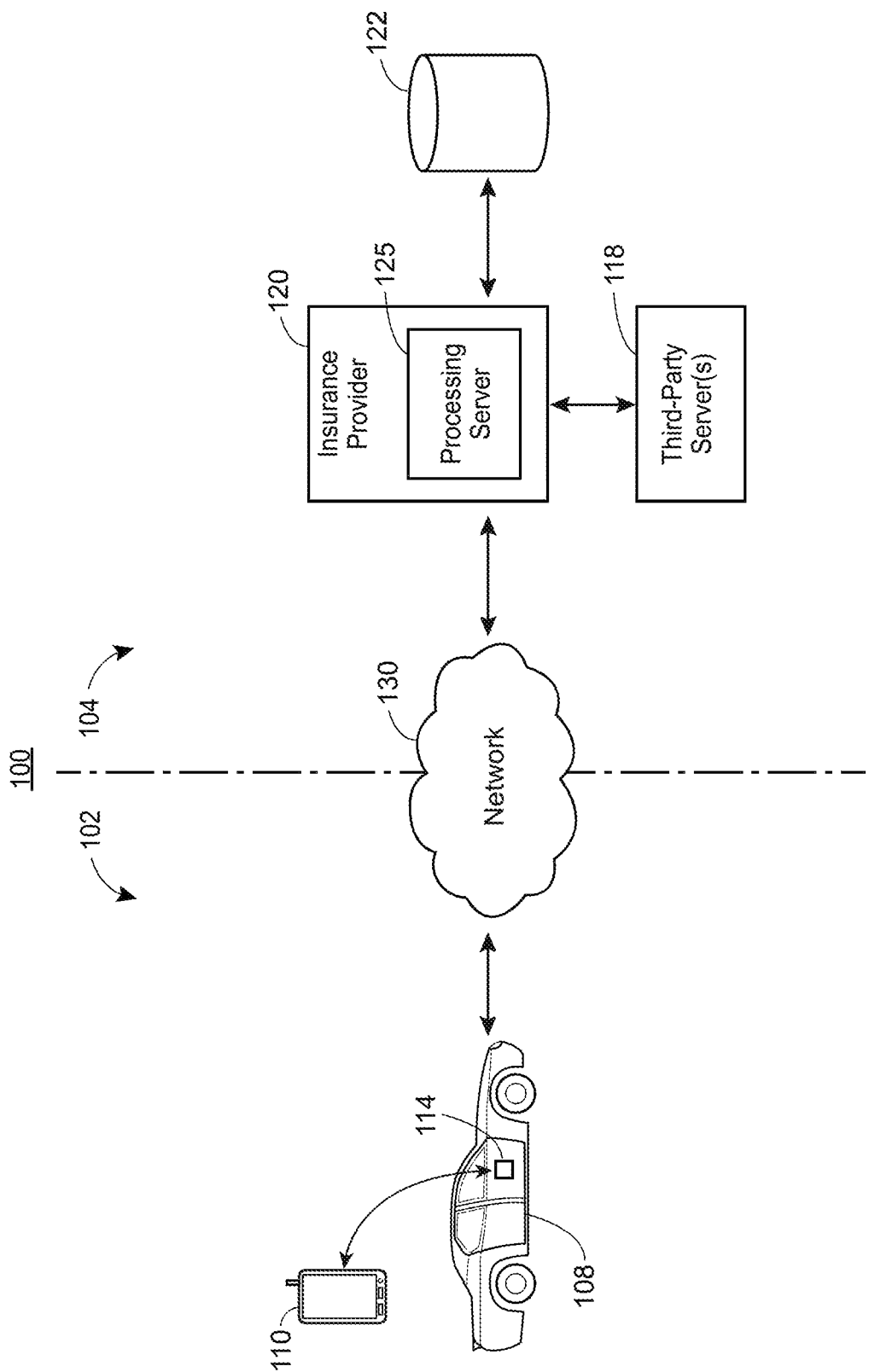
FIG. 1 depicts an example environment including components and entities associated with detecting risks and notifying vehicle operators of the risks, in accordance with some embodiments.

FIG. 1 depicts an example environment 100 of a high-level architecture associated with determining vehicle locations, assessing risks associated with the locations, and notifying customers or vehicle operators of the risks. Although FIG. 1 depicts certain entities and components in the environment 100, it should be appreciated that additional or alternate entities and components are envisioned. The high-level architecture includes both hardware and software applications, as well as various data communications channels for communicating data between the various hardware and software components.

The environment 100 may be roughly divided into front-end components 102 and back-end components 104. The front-end components 102 may present information to and receive information from a vehicle operator, user, or customer, and monitor the use of a vehicle 108 by the user. The vehicle 108 may be any type of car, automobile, truck, motorcycle, motorbike, fleet of vehicles, recreational vehicle, marine vessel, or other vehicle capable of being driven or operated by a driver or operator. The user may interact with components of the environment 100 using a client device 110 (e.g., a smart phone, a tablet computer, a desktop computer, a special purpose computing device, etc.), which may be communicatively connected to an on-board computer 114.

The one or more client devices 110 or on-board computers 114 may be permanently or removably installed in the vehicle 108. The client device 110 or the on-board computer 114 may interface with one or more sensors (not shown) within the vehicle 108 (e.g., an ignition sensor, an odometer, a system clock, a speedometer, a tachometer, an accelerometer, a location sensor, etc.), which sensors may also be incorporated within or connected to the client device 110 or the on-board computer 114. For example, one of the sensors may be a global positioning system (GPS) sensor configured to identify a current location of the vehicle 108. In some embodiments, the client device 110 may be a specialized computing device designed to monitor and record vehicle usage or location information, either independently or in conjunction with the on-board computer 114. The on-board computer 114 may supplement the functions performed by the client device 110 described herein by, for example, sending or receiving information to and from the client device 110 or the sensors (not shown). In one embodiment, the on-board computer 114 may perform all of the functions of the client device 110 described herein, in which case no client device 110 may be present in the system 100. In another embodiment, the client device 110 may perform all of the functions of the on-board computer 114, in which case no on-board computer 114 may be present in the system 100. The client device 110 and on-board computer 114 may communicate with one another directly over any wired or wireless communication channel, as a WAN, LAN, PAN, or other type of network.

The client device 110 may be either a general-use personal computer, cellular phone, smart phone, tablet computer, or a dedicated vehicle use monitoring device. Although only one client device 110 is illustrated, it should be understood that a plurality of client devices 110 may be used in some embodiments. The on-board computer 114 may be a general-use on-board computer capable of performing many functions relating to vehicle operation or a dedicated computer for monitoring vehicle usage. Further, the on-board computer 114 may be installed by the manufacturer of the vehicle 108 or as an aftermarket modification to the vehicle 108. In some embodiments, the client device 110 or on-board computer 114 may be thin-client devices that outsource some or most of the processing to the server 140.

According to embodiments, the front-end components 102 may communicate with the back-end components 104 via a network 130. As illustrated in FIG. 1, the back-end components 104 include an insurance provider 120. The insurance provider 120 can be any individual, group of individuals, company, corporation, or other type of entity that can offer and issue insurance policies for customers. The insurance provider 120 may offer and issue an insurance policy for the vehicle 108 and a user/vehicle operator of the vehicle 108. According to embodiments, the insurance provider 120 can include one or more processing server(s) 125 configured to facilitate the functionalities as discussed herein. Although FIG. 1 depicts the processing server 125 as a part of the insurance provider 120, it should be appreciated that the processing server 125 can be separate from (and connected to or accessible by) the insurance provider 120. Further, the processing server 125 may facilitate the functionalities discussed herein without an association with an insurance provider 120 (i.e., there is not a need for the vehicle 108 and/or an operator thereof to have an insurance policy). Each of the insurance provider 120 and the processing server 125 may include one or more computer processors adapted and configured to execute various software applications and routines. The insurance provider 120 and the processing server 125 may couple to or communicate with a database 122, which may be adapted to store data related to various insurance policies managed by the insurance provider 120. Such data might include, for example, identifications of vehicles, insurance policies associated with the vehicles, locations of vehicles, vehicle speed, among other data related to use of the vehicle 108, the vehicle operator or user, or the vehicle insurance policy, which may be uploaded to the insurance provider 120 via the network 130. The data can also include various sensor data associated with the vehicle 108 and detected by the on-board computer 114 and/or the client device 110.

The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol. The network 130 can also facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others).

The back-end components 104 may further include one or more third party servers 118 that may communicate with the insurance provider 120. The third party servers 118 may store or access data associated with certain locations or environments. For example, the third party servers 118 may store or access road conditions (e.g. city, highway, number of lanes, speed limits, dangerous intersections, deer crashes, hilly, curvy, road construction, school zones, narrow road or bridge, no shoulder on road, traffic signs), traffic conditions (e.g. volume and speed of traffic, slow or stopped traffic ahead, high volume of vehicles going to or from an event), weather conditions (e.g. temperature, precipitation, wind, fog, severe weather alert, sun in eyes), crime data (e.g. thefts, burglaries), and/or any other information that may be associated with a particular location. Although FIG. 1 depicts the third party server(s) 118 as separate from the insurance provider 120, it should be appreciated that the third party server(s) can be a part of the insurance provider 120.

Although the environment 100 is shown to include one vehicle 108, one client device 110, one on-board computer 114, one insurance provider 120, and one processing server 125, it should be understood that different numbers of vehicles 108, client devices 110, on-board computers 114, insurance providers 120, and processing servers 125 may be utilized. For example, the system 100 may include a multiplicity of client devices 110 or on-board computers 114, all of which may be interconnected via the network 130. Furthermore, the database storage or processing performed by the insurance provider 120 and/or the processing server 125 may be distributed among a servers in an arrangement known as "cloud computing." This configuration may provide various advantages, such as enabling near real-time uploads and downloads of information as well as periodic uploads and downloads of information. This may in turn support a thin-client embodiment of the client device 110 or on-board computer 114 discussed herein.

According to embodiments, the processing server 125 may receive sensor data from the on-board computer 114 and/or the client device 110 via the network 130. In particular, the sensor data can include location data (e.g., GPS coordinates) that indicate the location of the vehicle 108 (or that the processing server 125 may deem as the location of the vehicle 108). The sensor data can further include movement data for the vehicle 108. The processing server 125 can analyze the location and/or movement data to identify a specific location or environment of the vehicle 108. For example, the processing server 125 can determine that the vehicle 108 is traveling along a particular roadway. For further example, the processing server 125 can determine that the vehicle 108 is parked in a certain parking garage. It should be appreciated that the processing server 125 can interface with the third-party server(s) 118 to retrieve any relevant data or information when determining the vehicle location or environment.

The processing server 125 can analyze or examine the determined location or environment for the vehicle 108, as well as any location and environment data associated therewith, and determine any risk posed to the vehicle 108 based on the location or environment. The processing server 125 can interface with the third-party server(s) 118 to retrieve any relevant data or information when determining the risk(s) posed to the vehicle 108. According to embodiments, processing server 125 can identify the risk using real-time data (e.g., an approaching strong storm) or using historical/saved data (e.g., crime statistics for a neighborhood). The processing server 125 can also assess the degree or level of the risk, especially as it compares to degrees of other risks associated with the same or nearby locations.

In embodiments, the processing server 125 may notify the on-board computer 114 and/or the client device 110 of an identified risk as well as a degree of the identified risk. The on-board computer 114 and/or the client device 110 can display or indicate the notification to a customer or vehicle operator, where the notification may encourage the customer or vehicle operator to relocate the vehicle 108 to a different location or environment (or otherwise encourage the customer or vehicle operator to move the vehicle 108 from its present location or environment). At a subsequent time, such as if and when the customer moves the vehicle 108, the on-board computer 114 and/or the client device 110 can communicate updated location data or other operating data to the processing server 125. After receiving the updated location data, the processing server 125 can determine that the customer or vehicle operator has successfully mitigated the risk. In some embodiments, the processing server 125 can reward the customer or vehicle operator for successfully mitigating the risk.

Figure 2:
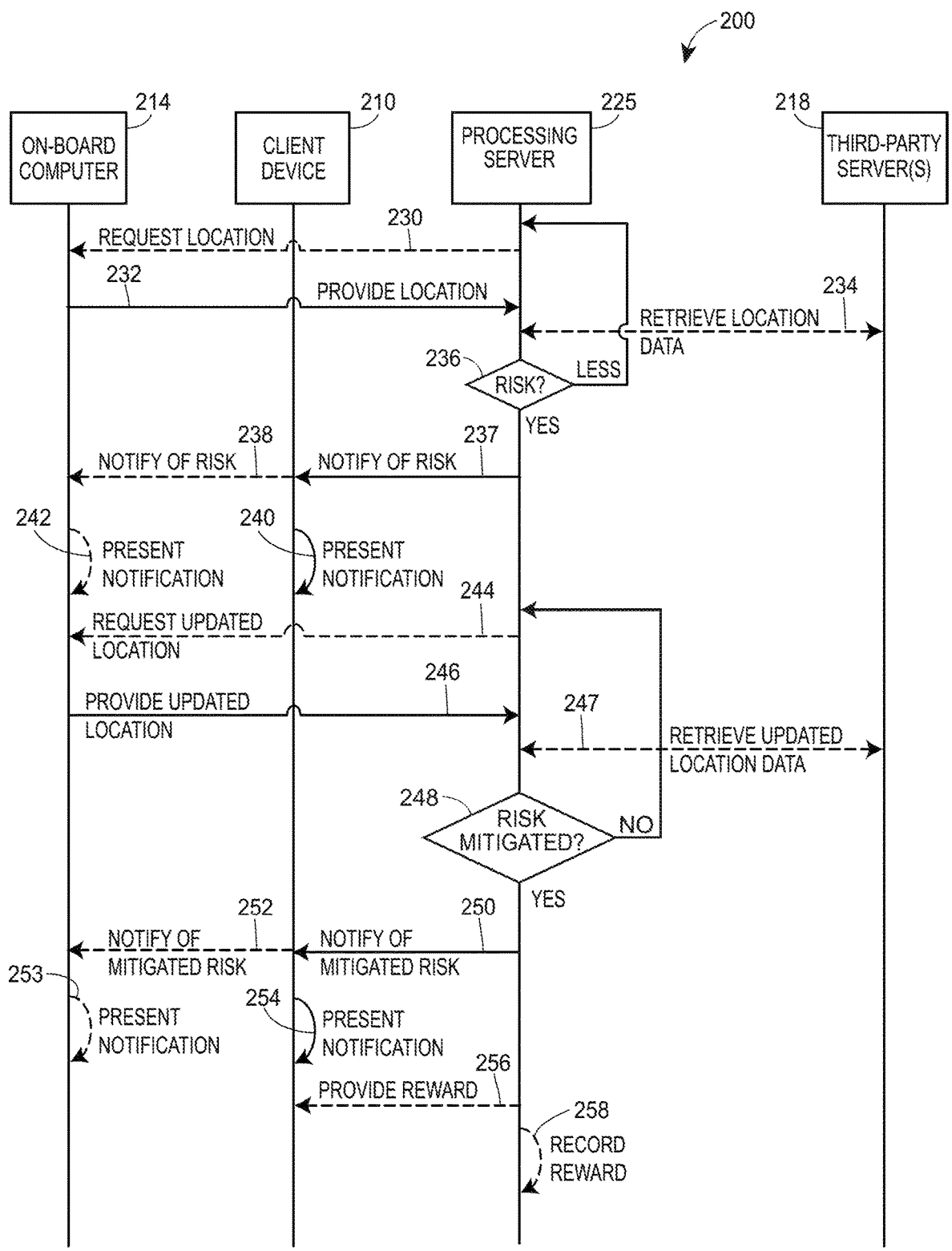
FIG. 2 depicts an example diagram associated with detecting risks and notifying vehicle operators of the risks, in accordance with some embodiments.

Referring to FIG. 2, illustrated is a signal diagram 200 associated with determining or assessing risks and notifying users of the risks. In particular, FIG. 2 includes an on-board computer 214 of a vehicle (such as the on-board computer 114 as described with respect to FIG. 1), a client device 210 of a user (such as the client device 110 as described with respect to FIG. 1), a processing server 225 (such as the processing server 125 as described with respect to FIG. 1), and one or more third party servers 218 (such as the third party server(s) as described with respect to FIG. 1).

The signal diagram 200 may begin when the processing server 225 optionally requests (230) the on-board computer 214 for its location. For example, the location may be in the form of GPS coordinates. In an alternative embodiment, the processing server 225 may request the client device 210 for its location, whereby the processing server 225 may deem the location of the client device 210 as the location of the vehicle (e.g., if the client device 210 is located in the vehicle). The on-board computer 214 (or the client device 210) may provide (232) its location to the processing server 225. It should be appreciated that the on-board computer 214 (or the client device 210) may provide its location automatically or in response to receiving the request from the processing server 225.

The processing server 225 may optionally retrieve (234) data associated with the location of the on-board computer 214 (or the client device 210) from the third-party server(s) 218. In particular, the location data may include road conditions (e.g., city, highway, number of lanes, speed limits, dangerous intersections, deer crashes, hilly, curvy, road construction, school zones, narrow road or bridge, no shoulder on road, traffic signs), traffic conditions (e.g., volume and speed of traffic, slow or stopped traffic ahead, high volume of vehicles going to or from an event), weather conditions (e.g., temperature, precipitation, wind, fog, severe weather alert, sun in eyes), crime data (e.g., thefts, burglaries), and/or any other information that may be associated with a particular location. For example, the location data may correspond to a parking garage with a high incidence of thefts or burglaries. For further example, the location data can indicate a roadway that is especially susceptible to dangerous conditions during a storm. In some embodiments, the processing server 225 may identify locally-stored information about the location of the vehicle (such as from a local database), without having to interface with the third-party server(s) 218.

The processing server 225 can determine (236) whether there is a risk (or more particularly, an elevated risk) posed to the vehicle and/or the user based the location data. In some cases, the processing server 225 can examine historical data to determine whether one or more incidents have occurred at or near the location. In other cases, the processing server 225 can calculate a statistical measurement (e.g., percentage chance) of incident associated with an identified risk. For example, the processing server 225 can determine that there is a 20% chance that a vehicle will experience damage caused by a storm in a vicinity of the vehicle. Further, the processing server 225 can compare the calculated percentage chance to a baseline percentage and determine whether the calculated percentage chance exceeds the baseline percentages by a certain threshold. Continuing with the example, if the baseline chance of a vehicle experiencing weather damage in normal circumstances is 2% and the threshold amount is 5%, then the processing server 225 can determine that there is a risk posed to the vehicle and/or the user. If the processing server 225 determines that there is less risk posed to the vehicle ("LESS"), processing can return to 230 where the processing server 225 may monitor for or receive updated location data.

If the processing server 225 determines that there is a risk posed to the vehicle ("YES"), the processing server 225 can provide (237) a notification of the risk to the client device 210. In some optional embodiments, the processing server 225 can provide (238) a notification of the risk to the on-board computer 214. It should be appreciated that the notification can be in one of many forms, including an audio notification, a display notification, a vibration, or other type of alert or notification. Further, the notification may include text or graphics that indicate the risk identified by the processing server 225, as well as tips or instructions for mitigating the risk. For example, the notification may indicate that a certain risk may be mitigated by relocating the vehicle. Upon receipt of the notification, the client device 210 can present (240) the notification to a user according to the type of notification (e.g., audio, display, vibration, etc.). In an optional embodiment, the on-board computer 214 can present (242) the notification to the user according to the type of notification (e.g., audio, display, vibration, etc.). The user may view the notification and assess the risk to determine whether to move or relocate the vehicle, or otherwise mitigate the risk.

At a time subsequent to providing the notification, the processing server 225 can optionally request (244) the on-board computer 214 for its updated location, such as its updated GPS coordinates. In an alternative embodiment, the processing server 225 may request the client device 210 for its updated location, whereby the processing server 225 may deem the updated location of the client device 210 as the updated location of the vehicle (e.g., if the client device 210 is located in the vehicle). The on-board computer 214 (or the client device 210) may provide (246) its updated location to the processing server 225. It should be appreciated that the on-board computer 214 (or the client device 210) may provide its updated location automatically or in response to receiving the request from the processing server 225.

The processing server 225 may optionally retrieve (247) data associated with the updated location of the on-board computer 214 (or the client device 210) from the third-party server(s) 218, such as data similar to the location data retrieved in 234. In some embodiments, the processing server 225 may identify locally-stored information about the updated location of the vehicle (such as from a local database). The processing server 225 can determine (248), based on the updated location data, if the risk identified in 236 has been mitigated, reduced, eliminated, or the like (generally: "mitigated"). In some cases, the processing server 225 can determine, based on the updated location, a change in the percentage chance of incident associated with the originally-identified risk. If the change in the percentage chance meets or exceeds a threshold value (or in some cases just decreases), than the processing server 225 may deem that the risk has been mitigated. In other cases, the processing server 225 can determine that the vehicle has been relocated from a certain location that has an associated risk of incident. For example, if the processing server 225 originally determined that the vehicle was parked in a parking garage that has a high rate of car burglaries, and the updated location data indicates that the vehicle has been removed from the parking garage, then the processing server 225 can determine that the risk has been mitigated.

In some embodiments, the processing server 225 can record an elapsed time period between when the initial location is received in 232 and when the updated location is received in 246. If the elapsed time period is below a certain threshold time period, then the processing server 225 may deem that the vehicle operator made an explicit effort to remove the vehicle from the posed risk. Of course, different risks may have different threshold time periods. For example, an associated time period for a dangerous intersection risk may be shorter than an associated time period for an approaching blizzard risk. If the processing server 225 determines that the risk has not been mitigated ("NO"), processing can return to 244 where the processing server 225 may monitor for or receive updated location data.

If the processing server 225 determines that the risk has been mitigated ("YES"), the processing server 225 can provide (250) a notification of the mitigated risk to the client device 210. In some optional embodiments, the processing server 225 can provide (252) a notification of the mitigated risk to the on-board computer 214. It should be appreciated that the notification can be in one of many forms, including an audio notification, a display notification, a vibration, or other type of alert or notification. Further, the notification may include text or graphics that indicate the mitigated risk. Upon receipt of the notification, the client device 210 can present (254) the notification to a user according to the type of notification (e.g., audio, display, vibration, etc.). In an optional embodiment, the on-board computer 214 can present (253) the notification to the user according to the type of notification (e.g., audio, display, vibration, etc.).

In some optional embodiments, the processing server 225 may determine to reward the user for mitigating the identified risk. In some cases, the processing server 225 may determine whether to reward the user based in part on the elapsed time period between when the initial location is received in 232 and when the updated location is received in 246 (i.e., the amount of time that the user took to mitigate the risk). In embodiments, the reward may be in the form of a reduced insurance premium, a discount on a subsequent insurance policy, or other rewards. Further, in some embodiments, the reward may be in the form of "points" or another type of virtual reward that may be associated with an application, game, or social network for which the user has account. Accordingly, the processing server 225 can provide (256) the reward to the client device 210. Further, the processing server 225 can record (258) the reward to enable the user to redeem the reward at a later time.

Although FIG. 2 depicts the processing server 225 receiving location data, identifying risks based on the location, and assessing the risks, it should be appreciated that the on-board computer 214 and/or the client device 210 may also perform these functionalities. In particular, the on-board computer 214 and/or the client device 210 may interface with the third-party server(s) 218 to retrieve location and environment data, determine any risks and degrees thereof, and notify the user of the risks. Further, the on-board computer 214 and/or the client device 210 may determine whether a risk has been mitigated based on updated location data.

Figure 3A:
FIGS. 3A and 3B depict example interfaces associated with detecting risks and notifying vehicle operators of the risks, in accordance with some embodiments.
Figure 3B:
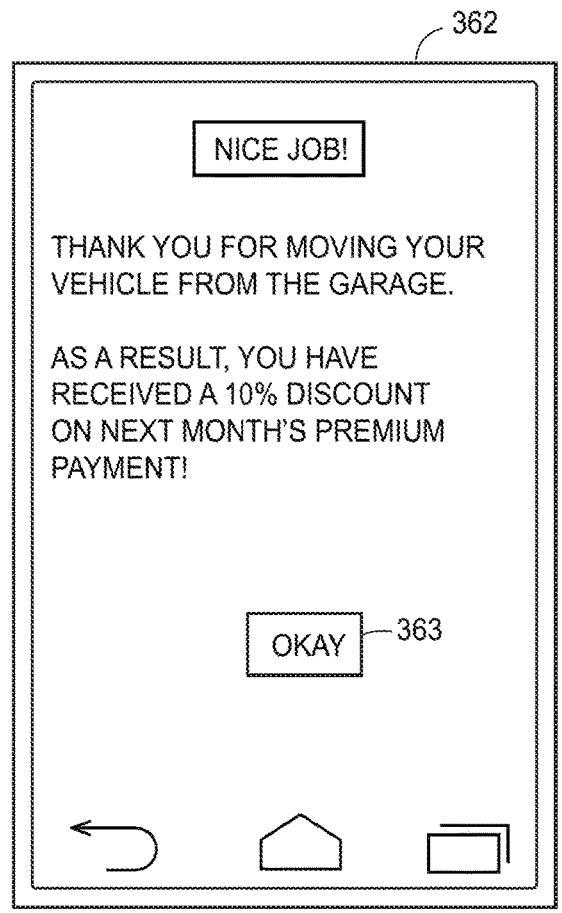

FIGS. 3A and 3B illustrate example interfaces associated with notifying a customer of an identified risk. A vehicle or a customer device (e.g., an on-board computer, a smartphone, etc.) may be configured to display the interfaces and receive selections and inputs via the interfaces. For example, a dedicated application that is configured to operate on the vehicle or consumer device may display the interfaces. It should be appreciated that the interfaces are merely examples and that alternative or additional content is envisioned. Further, it should be appreciated that alternative devices or machines may display the example interfaces. According to embodiments, the vehicle/customer device is configured to identify its location, such as via a GPS module.

FIG. 3A illustrates an interface 360 with a notification that informs a customer of an identified risk. In particular, the notification of the interface 360 informs the customer that his/her vehicle is parked in a garage with a high occurrence of car thefts. The vehicle/customer device may receive the notification from an insurance provider in response to the insurance provider identifying the risk, as discussed herein. The notification also encourages the customer to relocate the vehicle. The interface 360 includes an "okay" selection 361 that enables the user to dismiss the notification and return to a previous screen or interface.

FIG. 3B illustrates an interface 362 with a notification that informs the customer that the identified risk has been mitigated. The vehicle/customer device may receive the notification from the insurance provider in response to the insurance provider determining that the identified risk of the interface 360 has been mitigated based on an updated location of the vehicle. The notification of the interface 362 further indicates a reward of a 10% discount on a subsequent month's premium payment. The interface 360 includes an "okay" selection 363 that enables to the user dismiss the notification and return to a previous screen or interface.

Figure 4:
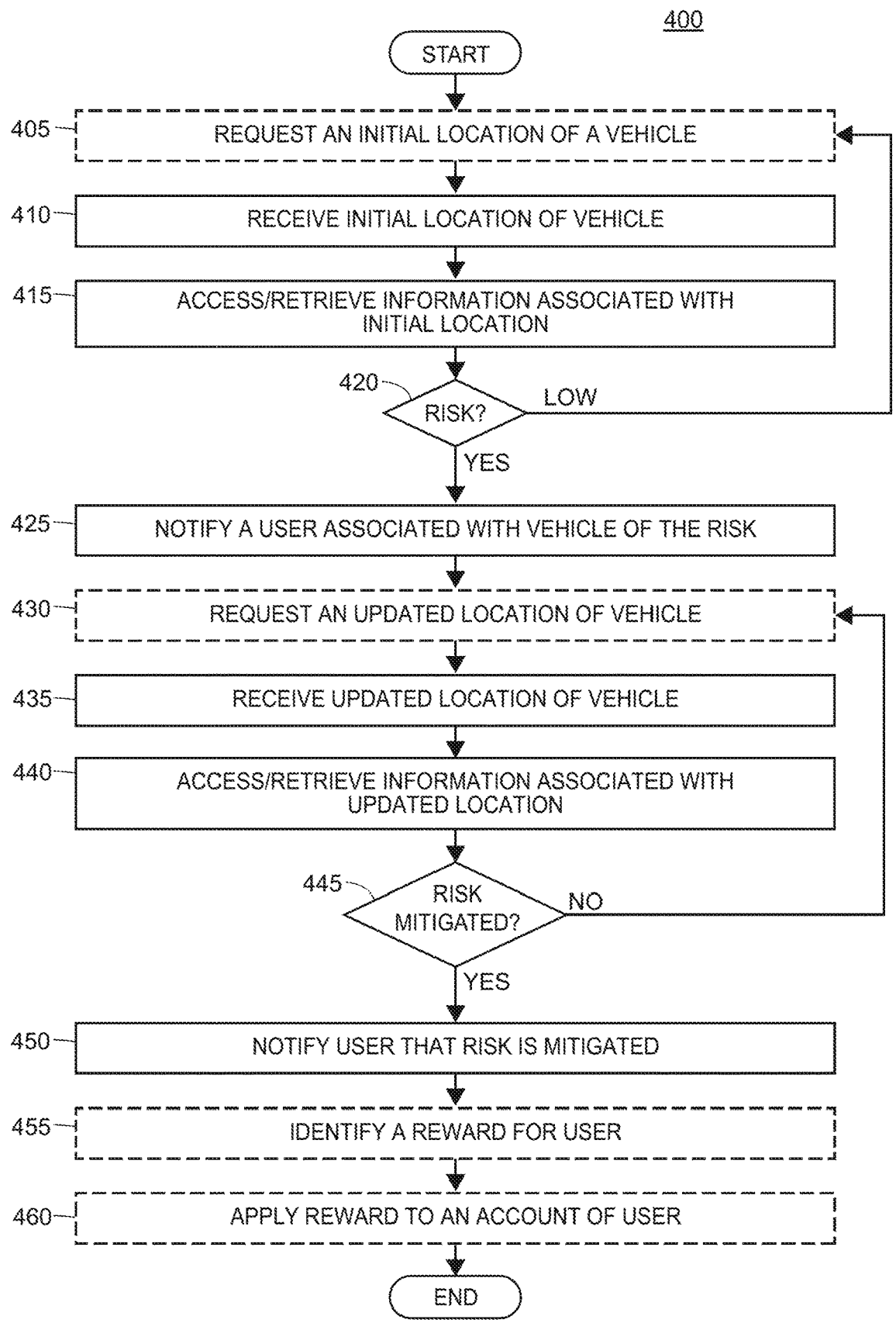
FIG. 4 depicts a flow diagram of detecting risks and notifying vehicle operators of the risks, in accordance with some embodiments

Referring to FIG. 4, depicted is a block diagram of an example method 400 for notifying a customer of a risk and determining whether the risk has been mitigate. The method 400 may be facilitated between the insurance provider 120 (and specifically the processing server 125) as depicted in FIG. 1 and a user associated with the vehicle (and/or an electronic device associated with the vehicle or the user). The customer may access any type of electronic or computing device (such as the on-board computer 114 or the electronic device 110) to input data and make appropriate selections.

The insurance provider can optionally request (block 405) an initial location of a vehicle. The user/vehicle device can identify its location and communicate the location to the insurance provider. Accordingly, the insurance provider can receive (block 410) the initial location of the vehicle, for example as GPS coordinates. The insurance provider can access or retrieve (415) information associated with the initial location. In some embodiments, the insurance provider can retrieve the information from one or more third-party servers.

The insurance provider can examine the accessed/retrieved information to determine (block 420) whether there is a risk associated with the vehicle's initial location. In some cases, the information can be historical data associated with the initial location and the insurance provider can determine that at least one incident has occurred at or near the initial location. In other cases, the insurance provider can calculate a statistical measurement (e.g., percentage chance) of the vehicle experiencing an incident at or near the initial location, and can determine whether the statistical measurement exceeds a baseline measurement by a threshold amount. For example, if the percentage chance is 8%, the baseline percentage chance is 3% and the threshold amount is 4%, then the insurance provider can determine that there is a risk for the vehicle at the initial location.

If the insurance provider determines that there is low risk associated with the initial location ("LOW"), processing can return to 405 or proceed to other functionality. If the insurance provider determines that there is a risk associated with the initial location ("YES"), processing can proceed to block 425 in which the insurance provider can notify the user of the risk and the user/vehicle device can present a notification accordingly. At a subsequent time, the insurance provider can optionally request (block 430) an updated location of the vehicle. The user/vehicle device can identify its updated location and communicate the updated location to the insurance provider. Accordingly, the insurance provider can receive (block 435) the updated location of the vehicle, for example as GPS coordinates. The insurance provider can access or retrieve (440) information associated with the updated location. In some embodiments, the insurance provider can retrieve the information from one or more third-party servers.

The insurance provider can examine the accessed/retrieved information associated with the updated location to determine (block 445) whether the risk has been mitigated. In some cases, the insurance provider can determine that the vehicle has been relocated from a certain location that has an associated risk of incident. In other cases, the insurance provider can calculate an updated percentage chance of the vehicle experience an incident at or near the updated location, and can compare the updated percentage chance to the originally-calculated percentage chance. For example, if the original percentage chance is 15% and the updated percentage chance is 10%, then the insurance provider can determine that the risk is mitigated. Of course, the insurance provider can factor threshold percentages into determining whether a risk is mitigated.

If the insurance provider determines that the risk is not mitigated ("NO"), processing can return to 430 or proceed to other functionality. If the insurance provider determines that the risk is mitigated ("YES"), processing can proceed to 450 in which the insurance provider can notify the user that the risk is mitigated and the user/vehicle device can present a notification accordingly. The insurance provider can optionally identify (block 455) a reward for the user based on the mitigated risk. In some embodiments, in identifying the reward, the insurance provider can account for an elapsed time between when the initial location is received (or when the user is notified) and when the updated location is received. The insurance provider can optionally apply (block 460) the reward to an account of the user.

Figure 5:
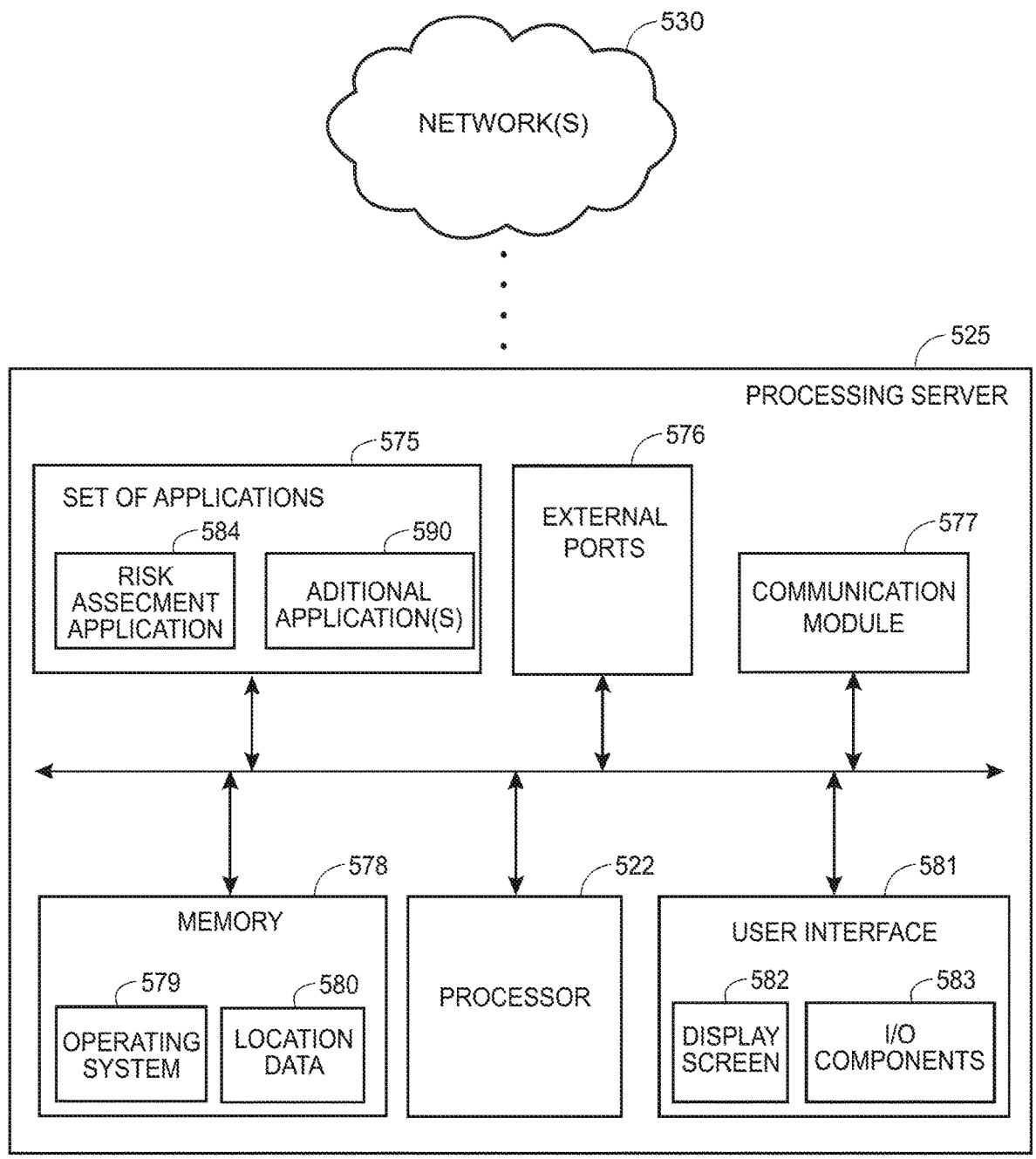
FIG. 5 is a block diagram of a computing device in accordance with some embodiments.

FIG. 5 illustrates a diagram of an example processing server 525 (such as the processing server 125 discussed with respect to FIG. 1) in which the functionalities as discussed herein may be implemented. It should be appreciated that the processing server 525 can be associated with an insurance provider, as discussed herein.

The processing server 525 can include a processor 522 as well as a memory 578. The memory 578 can store an operating system 579 capable of facilitating the functionalities as discussed herein as well as a set of applications 575 (i.e., machine readable instructions). For example, one of the set of applications 575 can be a risk assessment application 584 configured to identify and assess risks based on location data. The set of applications 575 can further include one or more additional applications 590.

The processor 522 can interface with the memory 578 to execute the operating system 579 and the set of applications 575. According to embodiments, the memory 578 can also include location data 580 that includes information associated with various locations. The risk assessment application 584 may interface with the location data 580 to retrieve relevant information that the risk assessment application 584 may use to identify and assess risks. The memory 578 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 525 can further include a communication module 577 configured to communicate data via one or more networks 530. According to some embodiments, the communication module 577 can include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 can send, via the network 530, requests for location data. The processing server 525 may further include a user interface 581 configured to present information to a user and/or receive inputs from the user. As shown in FIG. 5, the user interface 581 includes a display screen 582 and I/O components 583 (e.g., ports, capacitive or resistive touch sensitive input panels, keys, buttons, lights, LEDs, speakers, microphones). According to embodiments, the user may access the processing server 525 via the user interface 581 to process insurance policies, identify and assess risks, and/or perform other functions. In some embodiments, the processing server 525 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer implemented method of notifying a vehicle operator associated with a vehicle of a location-based risk, the method comprising:
    receiving, via a communication network at a first time from an electronic device, an initial location of the vehicle, the initial location (i) corresponding to where the vehicle is parked, and (ii) generated by a global positioning system (GPS) sensor incorporated within the electronic device;
    retrieving, by a processor from a third-party server, data associated with the initial location and indicating a set of risks posed to the vehicle in association with the initial location;
    examining the data to identify the location-based risk and a particular type of the location-based risk;
    identifying a threshold time period associated with the particular type of the location-based risk;
    calculating, by the processor based on the data, a percentage chance of incident to the vehicle at the initial location;
    automatically communicating, via the communication network, an indication of the location-based risk to the electronic device, the electronic device configured to display the indication of the location-based risk for assessment by the vehicle operator;
    subsequent to communicating the indication, receiving, via the communication network at a second time from the GPS sensor of the electronic device, an updated location of the vehicle;
    calculating, by the processor, (i) an updated percentage chance of incident, to the vehicle at the updated location, associated with the location-based risk;
    determining, by the processor, that the updated percentage chance of incident is not less than the threshold chance of incident;
    receiving, via the communication network at a third time from the GPS sensor of the electronic device, a subsequent updated location of the vehicle;
    calculating, by the processor, (i) a subsequent updated percentage chance of incident, to the vehicle at the subsequent updated location, associated with the location-based risk, and (ii) an elapsed time period between the first time and the third time;
    determining, by the processor, (i) that the subsequent updated percentage chance of incident is less than the percentage chance of incident, and (ii) that the elapsed time period is less than the threshold time period associated with the particular type of the location-based risk;
    determining a reward redeemable by the vehicle operator and associated with the location-based risk being mitigated; and
    causing a user of interface of the electronic device to display (i) a first notification that the location-based risk is mitigated and (ii) a second notification of the reward.

2. The computer implemented method of claim 1, wherein the data associated with the initial location comprises at least historical crime data.

3. The computer implemented method of claim 1, wherein the set of risks posed to the vehicle comprises a set of incidents that occurred in association with the initial location.

4. The computer implemented method of claim 1, wherein calculating the percentage chance of incident comprises:
    calculating the percentage chance of incident from additional information associated with the initial location.

5. The computer implemented method of claim 1, wherein calculating the updated percentage chance of incident comprises:
    calculating the updated percentage chance of incident from information associated with the updated location.

6. The computer implemented method of claim 1, wherein receiving the initial location of the vehicle comprises:
    requesting the electronic device for the initial location; and
    receiving the initial location from the GPS sensor of the electronic device.

7. The computer implemented method of claim 1, wherein receiving the updated location of the vehicle comprises:
    requesting the electronic device for the updated location.

8. The computer implemented method of claim 1, wherein determining the reward comprises:

determining, based at least in part on the elapsed period of time, the reward redeemable by the vehicle operator and associated with the location-based risk being mitigated.

9. A system for notifying a vehicle operator associated with a vehicle of a location-based risk, comprising:
a transceiver for communicating data via a communication network;
a memory storing non-transitory computer executable instructions; and
a processor interfacing with the transceiver, wherein the processor is configured to execute the non-transitory computer executable instructions to cause the processor to:
receive, via the transceiver at a first time from an electronic device, an initial location of the vehicle, the initial location (i) corresponding to where the vehicle is parked, and (ii) generated by a global positioning system (GPS) sensor incorporated within the electronic device,
retrieve, from a third-party server, data associated with the initial location and indicating a set of risks posed to the vehicle in association with the initial location,
examine the data to identify the location-based risk, wherein the location-based risk and a particular type of the location-based risk,
identify a threshold time period associated with the particular type of the location-based risk,
calculate, based on the data, a percentage chance of incident to the vehicle at the initial location,
automatically communicate, via the transceiver, an indication of the location-based risk to the electronic device, the electronic device configured to display the indication of the location-based risk for assessment by the vehicle operator,
subsequent to communicating the indication, receive, via the transceiver at a second time from the GPS sensor of the electronic device, an updated location of the vehicle,
calculate, by the processor, (i) an updated percentage chance of incident, to the vehicle at the updated location, associated with the location-based risk,
determine that the updated percentage chance of incident is not less than the threshold chance of incident,
receive, via the via the transceiver at a third time from the electronic device, a subsequent updated location of the vehicle,
calculate (i) a subsequent updated percentage chance of incident, to the vehicle at the subsequent updated location, associated with the location-based risk, and (ii) an elapsed time period between the first time and the third time,
determine (i) that the subsequent updated percentage chance of incident is less than the percentage chance of incident, and (ii) that the elapsed time period is less than the threshold time period associated with the particular type of the location-based risk,
determine a reward redeemable by the vehicle operator and associated with the location-based risk being mitigated, and
cause a user of interface of the electronic device to display (i) a first notification that the location-based risk is mitigated and (ii) a second notification of the reward.

10. The system of claim 9, wherein the data associated with the initial location comprises at least historical crime data.

11. The system of claim 9, wherein the set of risks posed to the vehicle comprises a set of incidents that occurred in association with the initial location.

12. The system of claim 9, wherein the processor calculates the percentage chance of incident from additional information associated with the initial location.

13. The system of claim 9, wherein the processor calculates the updated percentage chance of incident from information associated with the updated location.

14. The system of claim 9, wherein to receive the initial location of the vehicle, the processor is configured to:
request the electronic device for the initial location, and
receive, via the transceiver, the initial location from the GPS sensor of the electronic device.

15. The system of claim 9, wherein to receive the updated location of the vehicle, the processor is configured to:
request the electronic device for the updated location.

16. The system of claim 9, wherein the processor determines the reward redeemable by the vehicle operator and associated with the location-based risk being mitigated based at least in part on the elapsed period of time.

* * * * *